(12) United States Patent
Chanda et al.

(10) Patent No.: US 10,802,893 B2
(45) Date of Patent: Oct. 13, 2020

(54) PERFORMING PROCESS CONTROL SERVICES ON ENDPOINT MACHINES

(71) Applicant: Nicira, Inc., Palo Alto, CA (US)

(72) Inventors: Arijit Chanda, San Jose, CA (US); Rajiv Krishnamurthy, San Jose, CA (US); Arnold K. Poon, San Mateo, CA (US); Tori Chen, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/881,645

(22) Filed: Jan. 26, 2018

(65) Prior Publication Data
US 2019/0235934 A1    Aug. 1, 2019

(51) Int. Cl.
*G06F 3/00* (2006.01)
*G06F 9/54* (2006.01)

(52) U.S. Cl.
CPC .................... *G06F 9/542* (2013.01)

(58) Field of Classification Search
CPC ........................................ G06F 9/542
USPC ........................................ 709/318
See application file for complete search history.

(56) References Cited

U.S. PATENT DOCUMENTS

| | | | |
|---|---|---|---|
| 5,826,051 A * | 10/1998 | Porter | G06F 3/0481 715/810 |
| 5,950,195 A | 9/1999 | Stockwell et al. | |
| 6,363,477 B1 | 3/2002 | Fletcher et al. | |
| 6,430,188 B1 | 8/2002 | Kadambi et al. | |
| 6,496,935 B1 | 12/2002 | Fink et al. | |
| 6,781,990 B1 | 8/2004 | Puri et al. | |
| 6,880,089 B1 | 4/2005 | Bommareddy et al. | |
| 7,055,173 B1 | 5/2006 | Chaganty et al. | |
| 7,349,382 B2 | 3/2008 | Marimuthu et al. | |
| 7,543,054 B1 | 6/2009 | Bansod et al. | |
| 7,639,613 B1 | 12/2009 | Ghannarian et al. | |

(Continued)

FOREIGN PATENT DOCUMENTS

| | | |
|---|---|---|
| EP | 2748750 A1 | 7/2014 |
| WO | 2008095010 A1 | 8/2008 |

(Continued)

OTHER PUBLICATIONS

Maritza L. Johnson, Access Control Designed for Individuals at the Endpoints. (Year: 2010).*

(Continued)

*Primary Examiner* — Lechi Truong
(74) *Attorney, Agent, or Firm* — Adeli LLP (57) ABSTRACT

Some embodiments of the invention provide a method for performing services on an endpoint machine in a datacenter. On the endpoint machine, the method installs a guest introspection (GI) agent and a service engine. In some embodiments, the GI agent and the service engine are part of one monitor agent that is installed on the endpoint machine. The method then registers with a set of one or more notification services on the endpoint machine, the GI agent to receive notifications regarding new data message flow events on the endpoint machine. Through the notifications, the GI agent captures contextual data items regarding new data message flows, and stores the captured contextual data items. The service engine then performs a service for the data message flow based on the captured contextual data.

18 Claims, 6 Drawing Sheets

(56) References Cited

U.S. PATENT DOCUMENTS

| | | |
|---|---|---|
| 7,818,452 B2 | 10/2010 | Matthews et al. |
| 7,843,843 B1 | 11/2010 | Papp, III et al. |
| 7,948,986 B1 | 5/2011 | Ghosh et al. |
| 8,031,599 B2 | 10/2011 | Duffield et al. |
| 8,032,933 B2 | 10/2011 | Turley et al. |
| 8,095,662 B1 | 1/2012 | Lappas et al. |
| 8,190,767 B1 | 5/2012 | Maufer et al. |
| 8,365,294 B2 | 1/2013 | Ross |
| 8,381,209 B2 | 2/2013 | Reumann et al. |
| 8,484,739 B1 | 7/2013 | Seshadri |
| 8,655,307 B1 | 2/2014 | Walker et al. |
| 8,660,129 B1 | 2/2014 | Brendel et al. |
| 8,953,453 B1 | 2/2015 | Xiao et al. |
| 8,966,035 B2 | 2/2015 | Casado et al. |
| 9,009,836 B1 | 4/2015 | Yarykin et al. |
| 9,015,823 B2 | 4/2015 | Koponen et al. |
| 9,215,214 B2 | 12/2015 | Bansal et al. |
| 9,317,696 B2 | 4/2016 | Ayres et al. |
| 9,413,667 B2 | 8/2016 | Beliveau et al. |
| 9,444,841 B2 | 9/2016 | Feroz et al. |
| 9,565,202 B1 | 2/2017 | Kindlund et al. |
| 9,596,135 B1 * | 3/2017 | Thomas .............. H04L 41/0806 |
| 9,762,619 B1 | 9/2017 | Vaidya et al. |
| 9,891,940 B2 | 2/2018 | Feroz et al. |
| 9,948,611 B2 | 4/2018 | Kumar et al. |
| 9,996,697 B2 | 6/2018 | Mahaffey et al. |
| 9,998,955 B1 | 6/2018 | MacCarthaigh |
| 10,033,693 B2 | 7/2018 | Sengupta et al. |
| 10,228,959 B1 | 3/2019 | Anderson et al. |
| 10,324,746 B2 | 6/2019 | Kumar et al. |
| 10,333,983 B2 | 6/2019 | Vaidya et al. |
| 10,503,536 B2 | 12/2019 | Gunda |
| 10,581,960 B2 | 3/2020 | Gunda et al. |
| 10,606,626 B2 | 3/2020 | Feroz et al. |
| 10,609,160 B2 | 3/2020 | Poon et al. |
| 2002/0116523 A1 | 8/2002 | Warrier et al. |
| 2002/0122422 A1 | 9/2002 | Kenney et al. |
| 2003/0005118 A1 | 1/2003 | Williams |
| 2003/0093481 A1 | 5/2003 | Mitchell et al. |
| 2003/0093672 A1 | 5/2003 | Cichowlas |
| 2004/0049701 A1 | 3/2004 | Pennec et al. |
| 2004/0098620 A1 | 5/2004 | Shay |
| 2004/0117407 A1 | 6/2004 | Kumar et al. |
| 2004/0162901 A1 | 8/2004 | Mangipudi et al. |
| 2005/0080898 A1 | 4/2005 | Block |
| 2005/0114711 A1 | 5/2005 | Hesselink et al. |
| 2005/0198125 A1 | 9/2005 | Beck et al. |
| 2005/0257244 A1 | 11/2005 | Joly et al. |
| 2005/0286457 A1 * | 12/2005 | Foster ................ G06F 9/542 370/315 |
| 2006/0092861 A1 | 5/2006 | Corday et al. |
| 2007/0061492 A1 | 3/2007 | Riel |
| 2007/0143851 A1 | 6/2007 | Nicodemus et al. |
| 2008/0059474 A1 | 3/2008 | Lim |
| 2008/0072305 A1 | 3/2008 | Casado et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2008/0301630 A1 | 12/2008 | Arnold et al. |
| 2008/0316922 A1 | 12/2008 | Riddle et al. |
| 2008/0320550 A1 | 12/2008 | Strassner et al. |
| 2009/0007251 A1 | 1/2009 | Abzarian et al. |
| 2009/0055427 A1 | 2/2009 | Kulasingam et al. |
| 2009/0070442 A1 * | 3/2009 | Kacin ............... H04L 41/0803 709/221 |
| 2009/0129271 A1 | 5/2009 | Ramankutty et al. |
| 2009/0150521 A1 | 6/2009 | Tripathi |
| 2009/0178061 A1 | 7/2009 | Sandoval et al. |
| 2009/0187963 A1 | 7/2009 | Bori |
| 2009/0193497 A1 | 7/2009 | Kikuchi et al. |
| 2009/0228951 A1 | 9/2009 | Ramesh et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0254990 A1 | 10/2009 | McGee et al. |
| 2009/0281996 A1 | 11/2009 | Liu et al. |
| 2009/0327781 A1 | 12/2009 | Tripathi |
| 2010/0037311 A1 | 2/2010 | He et al. |
| 2010/0100616 A1 | 4/2010 | Bryson et al. |
| 2010/0125667 A1 | 5/2010 | Soundararajan |
| 2010/0138515 A1 * | 6/2010 | Ruiz-Velasco .......... G06F 9/445 709/217 |
| 2010/0228819 A1 | 9/2010 | Wei |
| 2010/0251363 A1 | 9/2010 | Todorovic |
| 2011/0016467 A1 | 1/2011 | Kane |
| 2011/0022695 A1 | 1/2011 | Dalal et al. |
| 2011/0055848 A1 * | 3/2011 | Vainionpaa ............... G06F 8/60 719/313 |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0208960 A1 | 8/2011 | Flood |
| 2011/0225624 A1 | 9/2011 | Sawhney et al. |
| 2011/0238581 A1 | 9/2011 | Severson et al. |
| 2011/0246637 A1 | 10/2011 | Murakami |
| 2012/0207174 A1 | 8/2012 | Shieh |
| 2012/0222114 A1 | 8/2012 | Shanbhogue |
| 2012/0240182 A1 | 9/2012 | Narayanaswamy et al. |
| 2012/0317570 A1 | 12/2012 | Dalcher et al. |
| 2013/0007740 A1 | 1/2013 | Kikuchi et al. |
| 2013/0007879 A1 | 1/2013 | Esteban et al. |
| 2013/0013669 A1 | 1/2013 | Chun et al. |
| 2013/0018994 A1 | 1/2013 | Flavel et al. |
| 2013/0019276 A1 | 1/2013 | Biazetti et al. |
| 2013/0073743 A1 | 3/2013 | Ramasamy et al. |
| 2013/0085880 A1 | 4/2013 | Roth et al. |
| 2013/0163594 A1 | 6/2013 | Sharma et al. |
| 2013/0205366 A1 | 8/2013 | Luna et al. |
| 2013/0219176 A1 | 8/2013 | Akella et al. |
| 2013/0227097 A1 | 8/2013 | Yasuda et al. |
| 2013/0227550 A1 | 8/2013 | Weinstein et al. |
| 2013/0268751 A1 * | 10/2013 | Preiss ............... H04M 1/72563 713/155 |
| 2013/0332983 A1 | 12/2013 | Koorevaar et al. |
| 2014/0007222 A1 | 1/2014 | Qureshi et al. |
| 2014/0020045 A1 | 1/2014 | Kabat et al. |
| 2014/0040182 A1 | 2/2014 | Gilder et al. |
| 2014/0059163 A1 | 2/2014 | Herbrich et al. |
| 2014/0067779 A1 | 3/2014 | Ojha |
| 2014/0068602 A1 | 3/2014 | Gember et al. |
| 2014/0115578 A1 | 4/2014 | Cooper et al. |
| 2014/0136681 A1 | 5/2014 | Greenlee et al. |
| 2014/0155043 A1 | 6/2014 | Gell et al. |
| 2014/0173624 A1 | 6/2014 | Kurabayashi |
| 2014/0195666 A1 | 7/2014 | Dumitriu et al. |
| 2014/0215226 A1 | 7/2014 | Litty et al. |
| 2014/0226820 A1 | 8/2014 | Chopra et al. |
| 2014/0230008 A1 | 8/2014 | Feroz et al. |
| 2014/0237119 A1 | 8/2014 | Chung et al. |
| 2014/0281030 A1 | 9/2014 | Cui et al. |
| 2014/0282539 A1 | 9/2014 | Sonnek |
| 2014/0282855 A1 | 9/2014 | Clark et al. |
| 2015/0012964 A1 | 1/2015 | Xie et al. |
| 2015/0067818 A1 * | 3/2015 | Molander ............. H04L 63/029 726/11 |
| 2015/0082301 A1 | 3/2015 | Garg et al. |
| 2015/0096007 A1 | 4/2015 | Sengupta et al. |
| 2015/0106438 A1 | 4/2015 | Fan et al. |
| 2015/0121061 A1 | 4/2015 | Goyal et al. |
| 2015/0134822 A1 | 5/2015 | Bhagwat et al. |
| 2015/0154293 A1 | 6/2015 | Lu |
| 2015/0163117 A1 | 6/2015 | Lambeth et al. |
| 2015/0169345 A1 | 6/2015 | DeCusatis et al. |
| 2015/0172208 A1 | 6/2015 | DeCusatis et al. |
| 2015/0269383 A1 | 9/2015 | Lang et al. |
| 2015/0350807 A1 * | 12/2015 | Andrews ............... H04W 76/14 455/414.2 |
| 2015/0358231 A1 | 12/2015 | Zhang et al. |
| 2015/0358344 A1 | 12/2015 | Mumcuoglu et al. |
| 2015/0379279 A1 | 12/2015 | Feroz et al. |
| 2015/0381578 A1 | 12/2015 | Thota et al. |
| 2016/0057167 A1 | 2/2016 | Bach |
| 2016/0072669 A1 | 3/2016 | Saavedra |
| 2016/0087905 A1 | 3/2016 | Liu et al. |

(56) References Cited

U.S. PATENT DOCUMENTS

| | | |
|---|---|---|
| 2016/0119194 A1 | 4/2016 | Lopez et al. |
| 2016/0173329 A1 | 6/2016 | Latham et al. |
| 2016/0191413 A1 | 6/2016 | Feroz et al. |
| 2016/0191521 A1 | 6/2016 | Feroz et al. |
| 2016/0212167 A1 | 7/2016 | Dotan et al. |
| 2016/0224789 A1 | 8/2016 | Feroz et al. |
| 2016/0232024 A1 | 8/2016 | Hamilton et al. |
| 2016/0234250 A1 | 8/2016 | Ashley et al. |
| 2016/0241389 A1 | 8/2016 | Saint et al. |
| 2016/0294923 A1 | 10/2016 | Fan et al. |
| 2016/0330138 A1 | 11/2016 | Thomason |
| 2016/0359658 A1 | 12/2016 | Yadav et al. |
| 2017/0063883 A1 | 3/2017 | Martinez |
| 2017/0063903 A1 | 3/2017 | Muddu et al. |
| 2017/0093664 A1 | 3/2017 | Lynam et al. |
| 2017/0099197 A1 | 4/2017 | Raney |
| 2017/0126677 A1 | 5/2017 | Kumar et al. |
| 2017/0170990 A1 | 6/2017 | Gaddehosur et al. |
| 2017/0171143 A1 | 6/2017 | Ge et al. |
| 2017/0171159 A1 | 6/2017 | Kumar et al. |
| 2017/0230419 A1 | 8/2017 | Prafullchandra et al. |
| 2017/0264628 A1 | 9/2017 | Treat et al. |
| 2017/0302685 A1 | 10/2017 | Ladnai et al. |
| 2017/0317978 A1 | 11/2017 | Diaz-Cuellar et al. |
| 2018/0063160 A1 | 3/2018 | Kumar |
| 2018/0063194 A1 | 3/2018 | Vaidya et al. |
| 2018/0103011 A1 | 4/2018 | Li et al. |
| 2018/0159733 A1 | 6/2018 | Poon et al. |
| 2018/0159943 A1 | 6/2018 | Poon et al. |
| 2018/0181423 A1 | 6/2018 | Gunda et al. |
| 2018/0181754 A1 | 6/2018 | Gunda |
| 2018/0181763 A1 | 6/2018 | Gunda |
| 2018/0183759 A1 | 6/2018 | Gunda et al. |
| 2018/0183761 A1 | 6/2018 | Gunda et al. |
| 2018/0183764 A1 | 6/2018 | Gunda |
| 2018/0183866 A1 | 6/2018 | Gunda et al. |
| 2018/0191763 A1 | 7/2018 | Hillard et al. |
| 2018/0212818 A1 | 7/2018 | Ide et al. |
| 2018/0241761 A1 | 8/2018 | Bania et al. |
| 2018/0351912 A1 | 12/2018 | Sengupta et al. |
| 2019/0034454 A1* | 1/2019 | Gangumalla ......... G06F 16/185 |
| 2019/0036956 A1 | 1/2019 | Gunda et al. |
| 2019/0149525 A1 | 5/2019 | Gunda et al. |
| 2019/0238429 A1 | 8/2019 | Chanda et al. |
| 2019/0266004 A1 | 8/2019 | Kumar et al. |
| 2019/0394302 A1 | 12/2019 | Kristiansson et al. |
| 2020/0036608 A1 | 1/2020 | Chanda et al. |

FOREIGN PATENT DOCUMENTS

| | | |
|---|---|---|
| WO | 2013074828 A1 | 5/2013 |
| WO | 2014126574 A1 | 8/2014 |
| WO | 2018044352 A1 | 3/2018 |
| WO | 2018106612 A1 | 6/2018 |
| WO | 2018118465 A1 | 6/2018 |

OTHER PUBLICATIONS

Nance, Kara, et al., "Virtual Machine Introspection: Obeservation or Interference?," IEEE Security and Privacy, Sep. 1, 2008, 6 pages, vol. 6, No. 5, IEEE Service Center, Los Alamitos, CA, US.

Author Unknown, "Cisco Identity-Based Firewall Security," Month Unknown 2011, 2 pages, Cisco Systems, Inc.

Author Unknown, "Enabling Service Chaining on Cisco Nexus 1000V Series," Month Unknown, 2012, 25 pages, Cisco.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Moshref, Masoud, et al., "vCRIB: Virtualized Rule Management in the Cloud," HotCloud'12, Jun. 12-13, 2012, 6 pages, Rubino, Roberto D., "An Open System for Transparent Firewall Authentication and User Traffic Identification within Corporate Intranets," Sigite '08, Oct. 16-18, 2008, 5 pages, ACM, Cincinnati, OH, USA.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Schulz-Zander, Julius, et al., "Realizing Software-Defined Wireless Networks: Acheiving Fine-Grained Wi-Fi Programmability with Off-the-Shelf Hardware," Apr. 20, 2016, 126 pages, Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," in Proc. of Sigcomm '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

Flegkas, Paris, et al., "On Policy-Based Extensible Hierarchical Network Management in QoS-Enabled IP Networks," Policy '01 Proceedings of the International Workshop on Policies for Distributed Systems and Networks, Jan. 29-31, 2011,17 pages, Spring-Verlag, London, UK.

Non-Published commonly Owned U.S. Appl. No. 15/650,251, filed Jul. 14, 2017, 91 pages, Nicira, Inc.

Non-Published commonly Owned U.S. Appl. No. 15/650,294, filed Jul. 14, 2017, 90 pages, Nicira, Inc.

Non-Published commonly Owned U.S. Appl. No. 15/650,340, filed Jul. 14, 2017, 90 pages, Nicira, Inc.

Non-Published commonly Owned U.S. Appl. No. 15/796,875, filed Oct. 30, 2017, 88 pages, Nicira, Inc.

Non-Published commonly Owned U.S. Appl. No. 15/830,074, filed Dec. 4, 2017, 40 pages, Nicira, Inc.

Non-Published commonly Owned U.S. Appl. No. 15/830,086, filed Dec. 4, 2017, 40 pages, Nicira, Inc.

Non-Published commonly Owned U.S. Appl. No. 15/836,888, filed Dec. 10, 2017, 59 pages, Nicira, Inc.

Non-Published commonly Owned U.S. Appl. No. 15/836,892, filed Dec. 10, 2017, 48 pages, Nicira, Inc.

Non-Published commonly Owned U.S. Appl. No. 15/847,898, filed Dec. 19, 2017, 50 pages, Nicira, Inc.

Non-Published commonly Owned U.S. Appl. No. 15/847,908, filed Dec. 19, 2017, 58 pages, Nicira, Inc.

Non-Published commonly Owned U.S. Appl. No. 15/881,639, filed Jan. 26, 2018, 34 pages, Nicira, Inc.

Non-Published commonly Owned U.S. Appl. No. 15/896,099, filed Feb. 14, 2018, 58 pages, Nicira, Inc.

Brownlee, N., et al., "Traffic Flow Measurement: Architecture," RFC 2722, Oct. 1999, 48 pages, The Internet Society.

(56) References Cited

OTHER PUBLICATIONS

Deri, Luca, et al., "nDPI: Open-Source High-Speed Deep Packet Inspection," 2014 International Wireless Communications and Mobile Computing Conference (IWCMC), Aug. 4-8, 2014, 6 pages, IEEE, Nicosia, Cyprus.

* cited by examiner

PERFORMING PROCESS CONTROL SERVICES ON ENDPOINT MACHINES

BACKGROUND

Traditional firewall solutions have been designed to enforce network access controls on two types of traffic flows, north-south flows and east-west flow. Firewall rules on north-south flow are enforced at the perimeter (edge) of a network (e.g. a datacenter network). This provides an ability to the security administrator to create firewall rules to control the flow of traffic in and out of the datacenter. East-west traffic flows are between different endpoints within a network (e.g., within a datacenter network).

In recent years, some have suggested distributed firewall architectures that deploy firewall service virtual machines (SVMs) or service engines on computers that host virtual machines (VMs) or containers. In such systems, the security administrator can configure, manage and enforce both north-south and east-west flows on both physical and logical entities. For example, a rule can be created to only allow TCP traffic on port 80 for any network interface on a logical network X. Such rules can be managed centrally but enforced in a distributed fashion on each host computer with a hypervisor.

In recent years, the number of applications that run inside the datacenter has increased dramatically. In such environments, a big challenge for the security and the application administrator is the ability to control the flow of traffic inside and outside of the network. Using distributed firewall, the administrator may be able to create rules using the traditional five-tuple approach or even add an additional attribute, such as L7 based services. This, however, does not provide the capability of an application process based attribute in either the source or the destination field of the rule. There are existing solutions in the market today that could provide firewalling functionalities inside the endpoint by using an agent and can provide application process level controls. These, however, do not have the ability to process virtual networking and security entities.

BRIEF SUMMARY

Some embodiments of the invention provide a method for performing services on an endpoint machine in a datacenter. On the endpoint machine, the method installs a guest introspection (GI) agent and a service engine. In some embodiments, the GI agent and the service engine are part of one monitor agent that is installed on the endpoint machine. The method then registers with a set of one or more notification services (e.g., network driver services, file system services) on the endpoint machine, the GI agent to receive notifications regarding new data message flow events and/or file system events on the endpoint machine.

Through the network service notifications, the GI agent captures contextual data items regarding new data message flows, and stores the captured contextual data items. Also, through these notifications, the service engine identifies data message flows associated with the endpoint machine and performs a service on the identified data message flows based on the stored contextual data items associated with the new data message flows. The service engine performs the service on the data messages based on service rules, each of which comprises a rule identifier and a service action, with the rule identifiers of at least a subset of service rules defined by reference to at least one contextual data item. In some embodiments, the contextual data items include data message attributes other than layer 2, layer 3 and layer 4 header values, such as layer 7 data tuples (e.g., user group identifiers, etc.) or other associated data tuples (e.g., identifiers of processes associated with the data message flows).

In some embodiments, the service engine receives notifications regarding a first data message in a new data message flow, performs the service on the first data message based on at least one stored contextual data item, and stores the result of the service on the first data message in a connection cache in order to re-use the stored result for subsequent data messages in the data message flow. Also, in some embodiments, the GI agent identifies through the notifications, newly launched processes executing on the endpoint machine, captures contextual data items regarding the identified processes, stores the captured contextual data items, and specifies stored contextual data items for new data message flows for the service engine to use when new data message flows associated with the processes are received.

As further described below, the service engine in some embodiments performs service operations on processes executing on the endpoint machine based on contextual data captured for the process. In some embodiments, the GI agent also receives through the notification additional contextual data regarding operations of previously launched processes (e.g., the type of files such processes are accessing, etc.), and based on this information the service engine performs service operations on data message flows associated with the processes and/or on the processes themselves. The service engine in some embodiments performs one or more middlebox service operations. Examples of middlebox services that the service engines perform in some embodiments include firewall operations, load balancing operations, intrusion detection operations, intrusion prevention operations, or any other middlebox operation.

Some embodiments of the invention provide a method for performing process-control services on processes executing on endpoint machines in the datacenter. Initially, on an endpoint machine, the method installs a GI agent and a service engine, which can be part of one monitor agent that is installed on the endpoint machine. The method then registers with a set of one or more notification services on the endpoint machine, the GI agent to receive notifications regarding new process events on the endpoint machine.

Through the notifications, the GI agent captures contextual data items regarding a newly launched or a previously launched process on the endpoint machine, and stores the captured contextual data items. Based on the contextual data items stored for the process, the service engine performs a process-control action on the newly launched or previously launched process. The process-control action in some embodiments can be Allow, Stop and Disallow, Stop and Terminate, which respectively would allow the launched process to proceed, stop the launched process and provide a notification regarding it being disallowed, or stop and terminate the launched process. In some embodiments, the process-control action also includes replicating the operations of the process in storage (e.g., in a sandbox) so that the process' operations can later be audited or reviewed. The process-control action in some embodiments also include malware detection and vulnerability operations. The service engine performs the process-control service based on service rules, each of which comprises a rule identifier and a service action, with the rule identifiers of at least a subset of service rules defined by reference to contextual attributes other than L2-L4 message header values.

In some embodiments, the GI agent notifies the service engine of each newly launched or certain previously launched processes. The GI agent in some embodiments provides at least one captured contextual data item to the service engine along with the notification regarding the process. Examples of contextual data associated with the process that the GI agent collects in some embodiments include process name, publisher, version, file hash, license info, etc. In some embodiments, the GI agent can identify the binary that started process and look up registry and/or the path to determine the contextual data.

In other embodiments, the service engine retrieves from a data storage at least one captured contextual data item that the GI agent stores in the storage for the process. In still other embodiments, the method registers with the set of notification services the service engine to receive notifications regarding a process (e.g., a new process launch event or a process file system access event) on the endpoint machine, and through such notifications, the service engine identifies process events in order to perform a service on the identified process or process event based on the contextual data items stored for the processes.

The method of some embodiments provides service rules to the endpoint machine from a server that belongs to a set of servers that manages performance of services the datacenter. In some embodiments, the server set manages services on other endpoint machines in the datacenter. These machines in some embodiments include machines executing on bare metal computers, virtual machines executing on hypervisors executing on host computers, and/or containers executing on host computers. The server set in some embodiments installs the monitor agent on one or more endpoint machine during a service deployment process that configures the endpoint machines to receive service rules form the sever set.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all of the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a service-management system for performing services on endpoint machines in a datacenter. On each of several endpoint machines, the service-management system installs a guest introspection (GI) agent and a service engine. In some embodiments, the GI agent and the service engine are part of one monitoring agent that service-management system installs on the endpoint machine. With a set of one or more notification services on the endpoint machine, the service-management system registers the GI agent to receive notifications regarding new data message flow events and/or file system events on the endpoint machine.

Through the network service notifications, the GI agent captures contextual data items regarding new data message flows, and stores the captured contextual data items. Also, through these notifications, the service engine identifies data message flows associated with the endpoint machine and performs a service on the identified data message flows based on the stored contextual data items associated with the new data message flows. The service engine performs the service on the data messages based on service rules. Each of the service rules comprises a rule identifier and a service action, with the rule identifiers of at least a subset of service rules defined by reference to contextual attributes that are different than L2-L4 header values.

In some embodiments, the service engine receives notifications regarding a first data message in a new data message flow, performs the service on the first data message based on at least one stored contextual data item, and stores the result of the service on the first data message in a connection cache in order to re-use the stored result for subsequent data messages in the data message flow. Also, in some embodiments, the GI agent identifies through the notifications, newly launched processes executing on the endpoint machine, captures contextual data items regarding the identified processes, stores the captured contextual data items, and specifies stored contextual data items for new data message flows for the service engine to use when new data message flows associated with the processes are received.

As further described below, the service engine in some embodiments performs service operations on processes executing on the endpoint machine based on contextual data captured for the process. In some embodiments, the GI agent also receives through the notification additional contextual data regarding operations of previously launched processes (e.g., the type of files such processes are accessing, etc.), and based on this information the service engine performs service operations on data message flows associated with the processes and/or on the processes themselves. The service engine in some embodiments performs a middlebox service in some embodiments. Examples of middlebox services that the service engines perform in some embodiments include firewall operations, load balancing operations, intrusion detection operations, intrusion prevention operations, or any other middlebox operation.

In some embodiments, the service-management system also performing process-control services on processes executing on endpoint machines in the datacenter. With a set of one or more notification services on the endpoint machine, the GI agent in these embodiments registers to receive notifications regarding new process events on the endpoint machine. Through the notifications, the GI agent captures contextual data items regarding newly launched or previously launched process on the endpoint machine, and stores the captured contextual data items.

Based on the contextual data items stored for the process, the service engine performs a process-control (PC) service on a newly launched or previously launched process. The process-control action in some embodiments can be Allow, Stop and Disallow, Stop and Terminate, which respectively would allow the launched process to proceed, stop the launched process and provide a notification regarding it being disallowed, or stop and terminate the launched process. In some embodiments, the process-control action in some embodiments also includes replicating the operations of the process in storage (e.g., in a sandbox) so that the process' operations can later be audited or reviewed. The process-control action in some embodiments also includes malware detection and vulnerability operations. The service engine performs the PC service based on service rules, each of which comprises a rule identifier and a service action, with the rule identifiers of at least a subset of service rules defined by reference to contextual attributes that are different than L2-L4 message header values.

In some embodiments, the GI agent notifies the service engine of each newly launched or previously launched process. The GI agent in some embodiments provides at least one captured contextual data item to the service engine along with the notification regarding the process. In other embodiments, the service engine retrieves from a data storage at least one captured contextual data item that the GI agent stores in the storage for the newly launched process. In still other embodiments, the service-management system registers the service engine with the set of notification services the service engine to receive notifications regarding a process (e.g., a new process launch event or a process file system access event) on the endpoint machine, and through such notifications, the service engine identifies process events in order to perform a service on the identified process or process event based on the contextual data items stored for the processes.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

The discussion below refers to containers, virtual machines and bare metal servers as endpoint machines. In some embodiments, an endpoint machine is a machine from which a data message flow originates, or is a machine at which a data message flow terminates and is consumed by the machine. A container is stand-alone, executable software package that includes everything needed to run it (e.g., code, runtime, system tools, system libraries, settings). Containers are available through a number of companies today, including Docker, Google, etc. Unlike virtual machines (VMs), containers are often constructs that run on top of a host operating system without the need for a hypervisor or separate guest operating system. In some cases, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers.

VMs, on the other hand, operate typically with their own guest operating systems on a host using resources of the host virtualized by virtualization software (e.g., a hypervisor, virtual machine monitor, etc.). The tenant (i.e., the owner of the VM) can choose which applications to operate on top of the guest operating system. A bare metal server is a single tenant physical server in some embodiments. In some embodiments, bare-metal servers do not run a hypervisor and are not virtualized. A bare-metal server in other embodiments can have a VM running on it but if so, it only has the VM of one tenant running on it.

Figure 1:
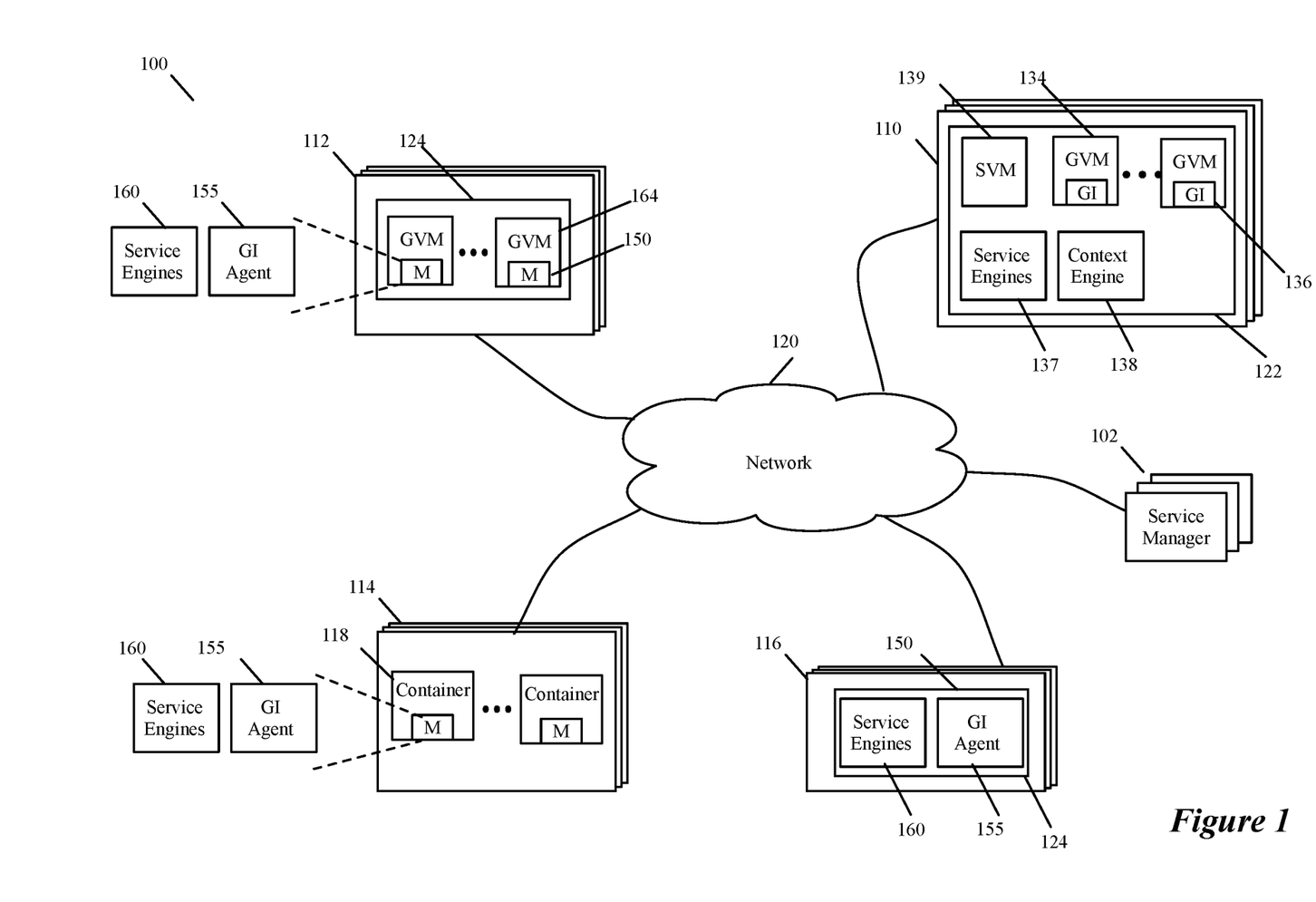
FIG. 1 illustrates a service-management system of some embodiments of the invention.

FIG. 1 illustrates a service-management system 100 of some embodiments of the invention. As shown, this system 100 includes a set of one or more service managers 102 that manage service engines and service machines that are deployed on host computers in a multi-tenant datacenter to perform services on these computers. The service engines/machines in some embodiments perform service operations on (1) processes executing on the host computers and (2) data messages received and/or sent by the host computers.

As further described below, these service operations in some embodiments can be based on contextual attributes that are associated with the processes and/or data messages. GI agents of the service-management system 100 capture these contextual attributes on the host computers in some embodiments. The service operations of the service engines/machines on the data messages can also be based on header values (e.g., L2-L4 header values) of the data messages, as further described below.

The service manager set 102 and the host computers 110-116 communicate through an internal network 120 of the datacenter. Even though in this example the service manager set 102 is in one datacenter with the host computers 110-116 that it manages, one of ordinary skill will realize that in other embodiments one or more of the components (e.g. the service managers or host computers) are in different physical locations (e.g., in different neighborhoods, cities, regions, states, etc.). In some these embodiments, the service manager set connects to host computers at other locations through external networks, such as the Internet.

In the service-management system 100 of FIG. 1, the host computers include (1) host computers 114 that execute containers, and (2) bare metal computers 116 that execute applications for only one tenant. The host computers in this example also include two other types of host computers 110 and 112. Both these types of host computers execute guest virtual machines (GVMs) 134 of tenants of the datacenter. The host computers 110 of the first type execute hypervisors 122 that have service engines or service VMs (SVMs) that can be configured by the service manager set 102, while the host computers 112 of the second type execute hypervisors 124 that do not have service engines or SVMs that can be configured by the service manager set 102.

In some embodiments, the service-management system 100 is part of a compute virtualization system that deploys VMs on host computers with hypervisors of a particular type, but not on host computers with other types of hypervisors. In other embodiments, the host computers 112 are in datacenters (e.g., are in public clouds) that are not under the control the administrators of the service-management system 100.

The service-management system 100 provides different mechanisms for the service manager set 102 to capture contextual attributes for context-rich service rules and to process these rules on different host computers in the datacenter. On a host computer 110 with a hypervisor that the system can directly configure, GI agents 136 of the service-management system execute on the GVMs 134, which execute on top of the hypervisor. In addition to the GVMs 134 and their GI agents 136, the host computers 110 also execute context engines 138 and one or more attribute-based service engines 137 and/or SVMs 139.

The GI agents 136 capture contextual attributes regarding newly launched processes, previously launched processes, and new data message flows to and from the GVMs, and provide these contextual attributes to the context engine 138 of the hypervisor. The context engine 138 then provides these contextual attributes to one or more service engines 137 and/or SVMs 139 executing on the host computer 110. The context engine can provide these contextual attributes based on either a push model (where the context engine sends the captured contextual attributes without the service engine requesting the attributes) or a pull model (where the context engine provides the captured contextual attributes in response to a request from the service engine).

In some embodiments, the service engines 137 operate in the kernel space of their associated hypervisors, while the SVMs 139 and GVMs 134 operates in the user space of their hypervisors. The service engines 137 are hypervisor-provided service modules in some embodiments, while the SVMs 139 are hypervisor-vendor SVMs and/or third-party SVMs (e.g., third party firewall SVMs, like those offered by Palo Alto Networks) that execute over the hypervisors on the host computers 110. In other embodiments, the service engines 137 also operate in the user space of the hypervisor.

The service engines 137 and/or SVMs 139 can use the captured contextual attributes to identify context-based service rules that specify service actions to perform on processes executing on the GVMs and/or data message flows sent by or received for the GVMs. The service engines 137 and/or SVMs 139 can also use header values (e.g., L2-L4 header values) of the data messages to identify service rules that specify service actions to perform on the data messages sent by and/or received for the GVMs. Several detailed architectures, systems and processes for providing contextual-based services on host computers 110 with managed hypervisors are described in U.S. patent application Ser. No. 15/650,251, filed Jul. 14, 2017, now published as U.S. Patent Publication 2018/0181423. U.S. patent application Ser. No. 15/650,251, now published as U.S. Patent Publication 2018/0181423, is incorporated herein by reference.

To enable context-rich services on the host computers 112-116 that do not have hypervisors that the service-manager set 102 can configure, the service-management system in some embodiments deploys a monitoring agent 150 in each endpoint machine associated with these host computers, and this monitoring agent 150 provides both the context capture and the processing of the context-based service rules. The endpoint machines on the host computers 112-116 are different. On the host computers 112, the GVMs 164 are the endpoint machines, and they are similar to the GVMs 134 that serve as endpoint machines on host computers 110 with hypervisors managed by the service manager set. On host computers 114, the endpoint machines are the containers 118. A bare metal computer 116 is itself the endpoint machine.

As shown, the monitoring agent 150 includes both a GI agent 155 and one or more service engines 160. Also, in these embodiments, the GI agent 155 performs both the context-capturing operations of the GI agent 136 and the context-repository operations of the context engine 138. Like the GI agents 136 of the GVMs with the managed hypervisors, the GI agents 155 register with notification services of their respective endpoint machines to receive notifications regarding newly launched processes and/or previously launched processes on their endpoint machines, and/or regarding new message flows sent by or received for their endpoint machine.

Different endpoint machines provide different APIs for GI agents 136 and 155 to use to register for such notification requests. For instance, on endpoint machines that execute Microsoft Windows, the GI agent in some embodiments registers hooks in the Windows Filtering Platform (WFP) to obtain network events, while registering in the Window's Process Subsystem to collect process related attributes. In some embodiments, the GI agent registers a hook at the Application Layer Enforcement (ALE) layer of WFP, so that it can capture all socket-connection requests from application processes on the VM.

After receiving notifications regarding a newly launched process or previously launched process executing on its endpoint machine, or a new message flow sent by or received for its endpoint machine, the GI agent 155 interacts with the endpoint machine modules to capture contextual attributes regarding the identified process, process events or data message flow. The GI agent 155 provides the captured contextual attributes to a service engine 160 based on either a push model (where the GI agent sends the captured contextual attributes without the service engine requesting the attributes) or a pull model (where the GI agent provides the captured contextual attributes in response to a request from the service engine).

Each service engine 160 can use the captured contextual attributes to identify context-based service rules that specify service actions to perform on processes executing on its respective endpoint machine and/or data message flows sent by or received for the endpoint machine. A service engine 160 can also use header values (e.g., L2-L4 header values) of the data messages that it process to identify service rules that specify service actions to perform on the data messages sent by and received for its respective endpoint machine.

The service-management system 100 uses the monitoring agents 150 to perform context-based services on endpoint machines on host computers 112-116, because it cannot deploy context or service engines outside of the endpoint machines on these computers. Moreover, the system cannot always ensure that it will always have reliable access to SVMs or service containers executing on these host computers. Even when it can have reliable access to such SVMs or service containers, it needs a mechanism to capture contextual attributes and to seamlessly provide the captured contextual attributes to the SVMs and/or service containers. However, on host computers without hypervisors managed by the service manager set 102, the service-management system 100 cannot reliably provide captured contextual attributes from GI agents to SVMs or service containers executing on the host computers.

Figure 2:
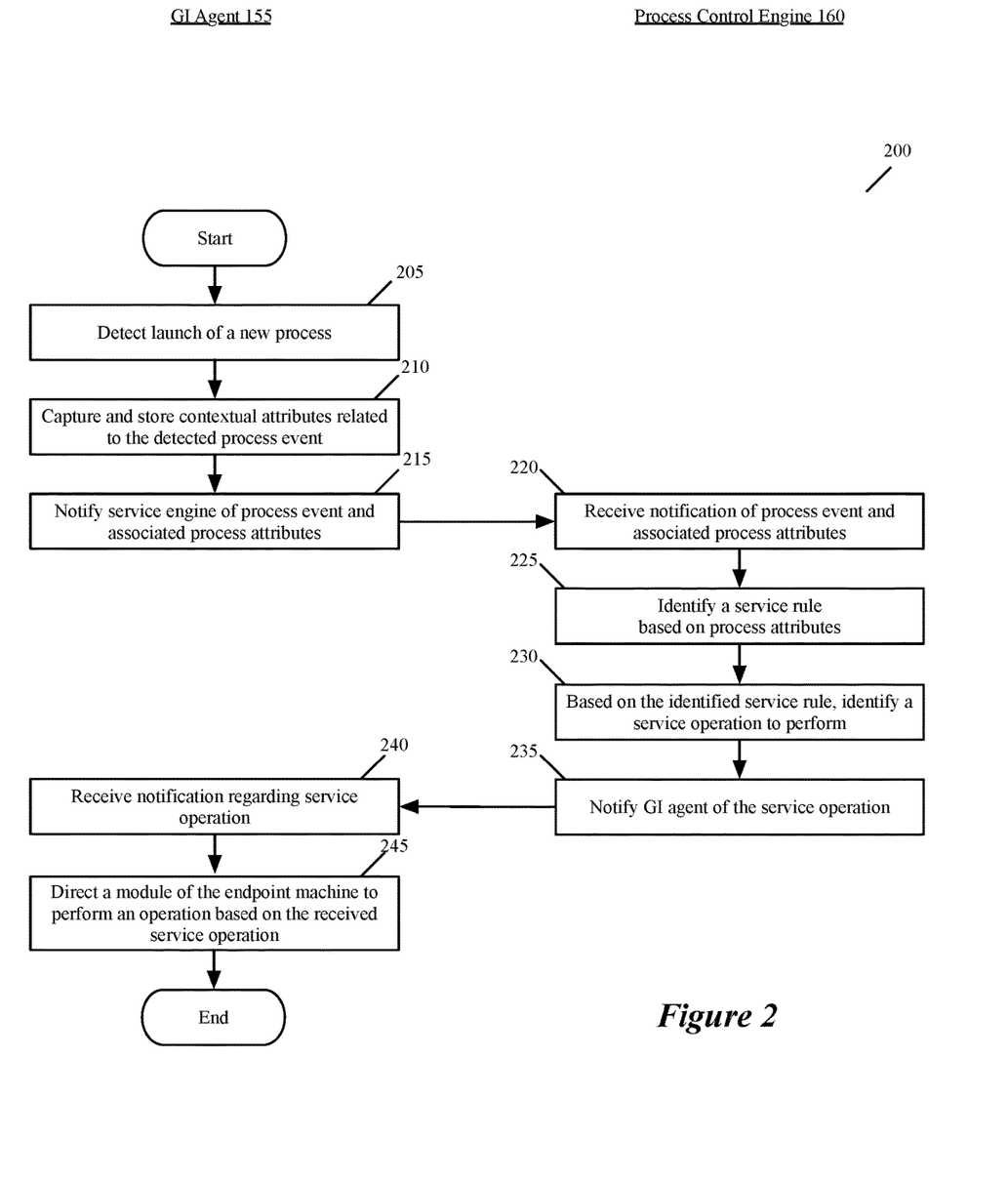
FIG. 2 illustrates a process control set of operations that is performed in some embodiments.

FIG. 2 illustrates a PC process 200 that is performed in some embodiments by the GI agent 155 and the service engine 160 of a monitoring engine on an endpoint machine (such as GVM 164, containers 118, or bare metal server 116). The process 200 captures contextual attributes regarding a newly launched process and then uses the captured contextual attributes to perform a PC service for the detected, newly launched process.

The process 200 starts when the GI agent 155 detects (at 205) a launch of a new process. As mentioned above, the GI agent 155 in some embodiments registers with one or more notification services on the endpoint machine to receive notification of certain process and flow events. In some embodiments, the launch of a new process is one type of event for which the GI agent registers for notifications. Hence, in these embodiments, the GI agent 155 detects (at 205) that a new process has been launched when the process subsystem of the GI agent's respective endpoint machine sends the GI agent a new process notification. This process notification in some embodiments includes an identifier that identifies the newly launched process.

The GI agent 155 then interacts (at 210) with one or more modules (e.g., the notification service modules) of its endpoint machine to collect and store contextual attributes relating to the newly launched process. In some embodiments, these attributes include the name of the application associated with the launched process, the application version, the identifier (ID) of the user account that launched the process, the group ID associated with the user account (e.g., the LDAP group (e.g., Active Directory group) to which the user account belongs), a threat level of the application, a resource consumption metric associated with the launched process, publisher of the application associated with the process, the file hash, the license information, etc.

At 215, the GI agent 155 then notifies a service engine 160 in its monitor agent 150 of the detected newly launched process. With this notification, the GI agent 155 also provides (at 215) the set of contextual attributes that it has collected for the launched process (e.g., provides an identifier for a storage location that stores the collected contextual attribute set). The service engine 160 receives this notification and the collected contextual attribute set at 220.

The service engine uses the collected contextual attribute set to identify (at 225) a PC rule in a PC rule data storage that it maintains. In some embodiments, the PC rules in this data storage are stored in a hierarchical manner (e.g., with priority levels for the rules to ensure that higher priority rules are selected before lower priority rules when multiple rules match a particular process). Also, in some embodiments, the PC rules in this data storage have rule identifiers that are defined in terms of one or more contextual attributes, such as application name, application version, user ID, group ID, threat level, resource consumption level, publisher of the application associated with the process, the file hash, the license information, etc. To identify the PC rule in the PC data store, the service engine 160 in some embodiments compares the collected contextual attributes with the rule identifiers of the PC rules to identify the highest priority rule that has an identifier that matches the collected attribute set.

When the process identifies a PC rule (at 225), it identifies (at 230) a PC action (e.g., Allow, Stop and Disallow, Stop and Terminate, etc.) of this rule, and then notifies (at 235) the GI agent 155 of this action. The GI agent receives (at 240) the notification for this action and then directs (at 245) a module on its endpoint machine to perform a PC operation based on the received action. When this operation is a disallow or a terminate, the service engine 160 directs the GI agent 155 to disallow or terminate the process. The GI agent then directs the process subsystem of the OS to disallow or terminate the process. After 245, the process ends.

In some embodiments, the process 200 performs other service operations for a detected process event. These operations include replicating the operations of the process in storage (e.g., in a sandbox) so that the process' operations can later be audited or reviewed. The process-control action in some embodiments also includes malware detection and vulnerability operations.

Figure 3:
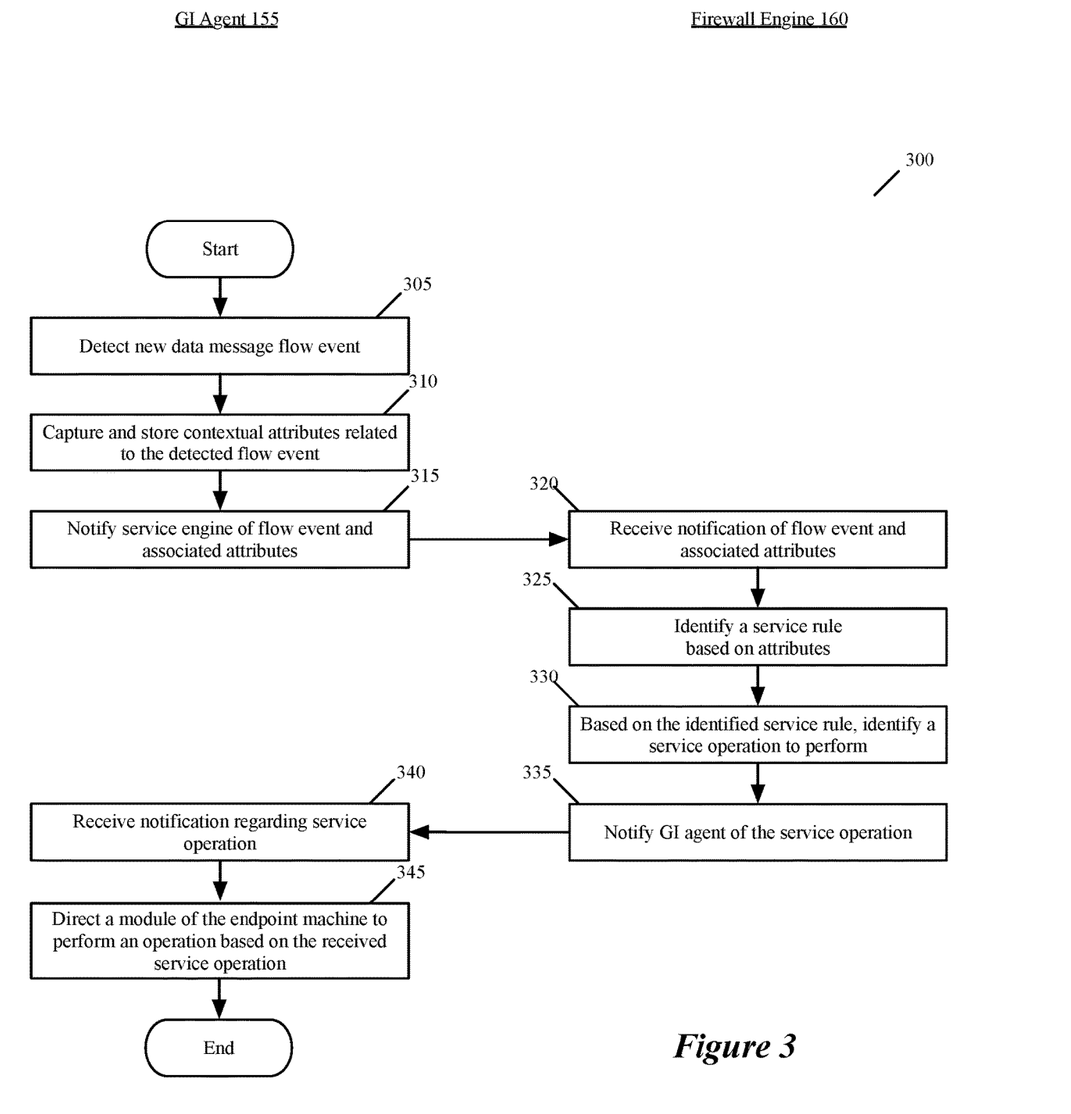
FIG. 3 illustrates an exemplary firewall process that is performed in some embodiments.

In addition to PC services, the service engines 160 in some embodiments perform middlebox service operations, such firewall operations, load balancing operations, intrusion detection operations, intrusion prevention operations, or any other middlebox operation. FIG. 3 illustrates an exemplary firewall process 300 that is performed in some embodiments by the GI agent 155 and the service engine 160 of a monitoring engine on an endpoint machine (such as GVM 164, containers 118, or bare metal server 116). The process 300 captures contextual attributes regarding a newly detected message flow and then uses the captured contextual attributes to perform a firewall operation for the detected, newly detected message flow.

The process 300 starts when the GI agent 155 detects (at 305) a start of a new data message flow. As mentioned above, the GI agent 155 in some embodiments registers with one or more notification services on the endpoint machine to receive notification of certain process and flow events. In some embodiments, the start of a new data message flow is one type of event for which the GI agent registers for notifications. For instance, on Windows machines, the GI agent registers a hook at the ALE layer of WFP, so that it can capture all socket-connection requests from application processes on the endpoint machine.

Accordingly, in some embodiments, the GI agent 155 detects (at 305) that a new data message flow has been started when the network stack of the GI agent's respective endpoint machine sends the GI agent a notification of a new requested data message flow. This notification in some embodiments includes a flow identifier (e.g., a five-tuple identifier) that identifies the newly detected message flow. The GI agent 155 then interacts (at 310) with one or more modules (e.g., the notification service modules) of its endpoint machine to collect and store contextual attributes relating to the newly detected message flow. In some embodiments, these attributes include the name of the application associated with the detected message flow, the application version, the identifier (ID) of the user account that started the process associated with the data message flow, the group ID associated with the user account (e.g., the LDAP group to which the user account belongs), a threat level of the application, a resource consumption metric associated with the detected message flow, etc.

At 315, the GI agent 155 then notifies a firewall engine 160 in its monitor agent 150 of the detected newly detected message flow. With this notification, the GI agent 155 also provides (at 315) the set of contextual attributes that it has collected for the detected message flow (e.g., provides an identifier for a storage location that stores the collected contextual attribute set). The firewall engine 160 receives this notification and the collected contextual attribute set at 320.

The firewall engine uses (at 325) the collected contextual attribute set to identify a firewall rule in a firewall rule data storage that it maintains. In some embodiments, the firewall rules in this data storage are stored in a hierarchical manner (e.g., with priority levels for the rules to ensure that higher priority rules are selected before lower priority rules when multiple rules match a particular flow).

Also, in some embodiments, the firewall rules in this data storage have rule identifiers that are defined in terms of one or more contextual attributes, such as application name, application version, user ID, group ID, threat level, resource consumption level, etc. The rule identifiers can also be defined in terms of L2-L4 message header values. To identify the firewall rule in the PC data store, the firewall engine 160 in some embodiments compares the collected contextual attributes and/or L2-L4 header values of the data message with the rule identifiers of the firewall rules to identify the highest priority rule that has an identifier that matches the data message's contextual attributes and/or L2-L4 header values.

When the process identifies (at 325) a firewall rule, it identifies (at 330) a firewall action (e.g., Allow, Drop, Redirect, etc.) of this rule, and then notifies (at 335) the GI agent 155 of this action. The GI agent receives (at 340) the notification for this action and then directs (at 345) a module on its endpoint machine (e.g., a module in the network stack of the endpoint machine) to perform the firewall operation based on the received action. For instance, when this operation is drop or redirect the data message, the service engine 160 in some embodiments directs the GI agent 155 to drop or redirect the data message, and the GI agent directs the network stack of the OS to drop or redirect the data message. After 345, the process ends.

In some embodiments, each time a firewall engine identifies a firewall rule to process a new data message, the firewall engine creates a record in a connection state cache to store the firewall action performed, so that when the firewall engine receives another data message within the same flow (i.e., with the same five-tuple identifier), it can perform the same firewall action that it performed on previous data messages in the same flow. The use of the connection state cache allows the firewall engine to process the data message flows more quickly. In some embodiments, each cached record in the connection state cache has a record identifier that is defined in terms of data message identifiers (e.g., five-tuple identifiers). In these embodiments, the process compares the received data message's identifier (e.g., five-tuple identifier) with the record identifiers of the cached records to identify any record with a record identifier that matches the received data message's identifier.

Figure 4A:
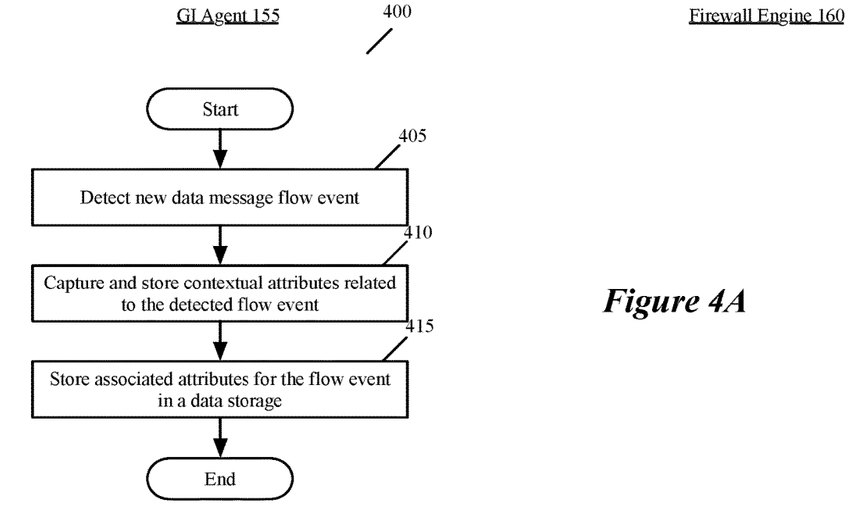
FIGS. 4A and 4B illustrates alternative processes that are performed in some embodiments to provide firewall services on an endpoint machine.
Figure 4B:
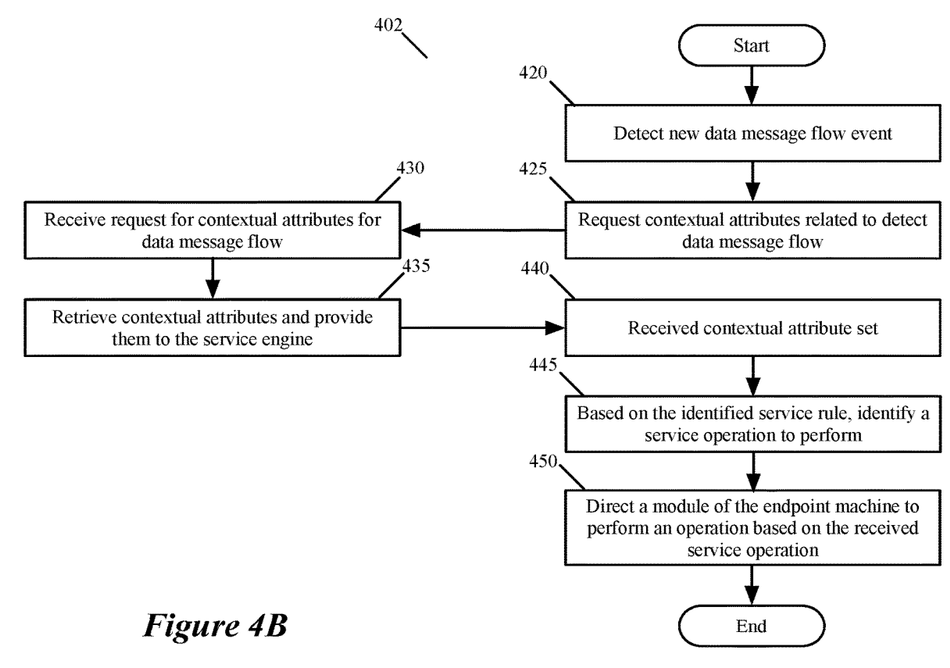

In the approach illustrated in FIG. 3, the GI agent 155 of the monitor agent 150 is the only module that registers with the notification services of endpoint machine to receive notifications of new data message flow events. In other embodiments, however, both the GI agent 155 and the firewall engine 160 of the monitor agent 150 register separately with the notification services of endpoint machine to receive notifications of new data message flow events. For such embodiments, FIGS. 4A and 4B illustrates alternative processes 400 and 402 that the GI agent 155 and the firewall service engine 160 perform to provide firewall services on an endpoint machine, such as GVM 164, containers 118, or bare metal server 116.

The process 400 starts when the GI agent 155 detects (at 405) a start of a new data message flow. As mentioned above, the GI agent 155 in some embodiments registers with one or more notification services on the endpoint machine to receive notification of each new data message flow. Accordingly, in some embodiments, the GI agent 155 detects (at 405) that a new data message flow has been started when the network stack of the GI agent's respective endpoint machine sends the GI agent a notification of a new requested data message flow. This notification in some embodiments includes a flow identifier (e.g., a five-tuple identifier) that identifies the newly detected message flow.

The GI agent 155 then interacts (at 410) with one or more modules (e.g., the notification service modules) of its endpoint machine to collect and store contextual attributes relating to the newly detected message flow. In some embodiments, these attributes include the name of the application associated with the detected message flow, the application version, the identifier (ID) of the user account that started the process associated with the data message flow, the group ID associated with the user account (e.g., the LDAP group to which the user account belongs), a threat level of the application, a resource consumption metric associated with the detected message flow, etc.

At 415, the GI agent 155 then stores the contextual attribute set that it collects (at 410) for the new data message flow. In some embodiments, the GI agent 155 stores in the contextual attribute set along with the flow identifier (e.g., the five tuple identifier including the source and destination IP addresses, source and destination ports and the protocol of the flow) in a data storage. The GI agent 155 so stores this data so that it can later provide the contextual data to the firewall engine 160 once the firewall engine 160 provides the flow identifier in a context-attribute query that it makes from the GI agent. After 415, the process 400 ends.

The process 402 starts when the firewall engine 160 detects (at 420) a start of a new data message flow. The firewall engine 160 in some embodiments registers with one or more notification services on the endpoint machine to receive notification of each new data message flow. Accordingly, in some embodiments, the firewall engine 160 detects (at 420) that a new data message flow has been started when the network stack of the firewall engine's respective endpoint machine sends the firewall engine a notification of a new requested data message flow. This notification in some embodiments includes a flow identifier (e.g., a five-tuple identifier) that identifies the newly detected message flow.

The firewall engine 160 then uses (at 425) the detected flow's identifier (e.g., the five-tuple identifier) to query the GI agent 155 for the contextual attribute set of the detected flow. The GI agent receives (at 430) this query and in response, uses (at 435) the flow's identifier to retrieve the contextual attribute set for this flow from its data storage. The firewall engine 160 receives (at 440) the contextual attribute set from the GI agent 155.

The firewall engine uses (at 445) the collected contextual attribute set to identify a firewall rule in a hierarchical firewall rule data storage that it maintains. In some embodiments, the firewall rules in this data storage have rule identifiers that are defined in terms of one or more contextual attributes, such as application name, application version, user ID, group ID, threat level, resource consumption level, etc. Also, in some embodiments, the rule identifiers can include the L2-L4 header values of the data messages. Accordingly, to identify the firewall rule in the PC data store, the firewall engine 160 in some embodiments compares the collected contextual attributes and/or the data message header values with the rule identifiers of the firewall rules to identify the highest priority rule that has an identifier that matches the collected attribute set.

When the process identifies (at 425) a firewall rule, it identifies (at 430) a firewall action (e.g., Allow, Drop, Redirect, etc.) of this rule, and then directs (at 435) a module on its endpoint machine (e.g., a module in the network stack of the endpoint machine) to perform the firewall operation based on the received action. For instance, when this operation is drop or redirect the data message, the service engine 160 in some embodiments directs the network stack of the OS to drop or redirect the data message. After 445, the process ends.

As was the case for the process 300, each time the firewall engine 160 identifies a firewall rule to process a new data message for the process 402, the firewall engine creates a record in a connection state cache to store the firewall action performed, so that when the firewall engine receives another data message within the same flow (i.e., with the same five-tuple identifier), it can perform the same firewall action that it performed on previous data messages in the same flow. In some embodiments, each cached record in the connection state cache has a record identifier that is defined in terms of data message identifiers (e.g., five-tuple identifiers). In these embodiments, the process compares the received data message's identifier (e.g., five-tuple identifier) with the record identifiers of the cached records to identify any record with a record identifier that matches the received data message's identifier.

Figure 5:
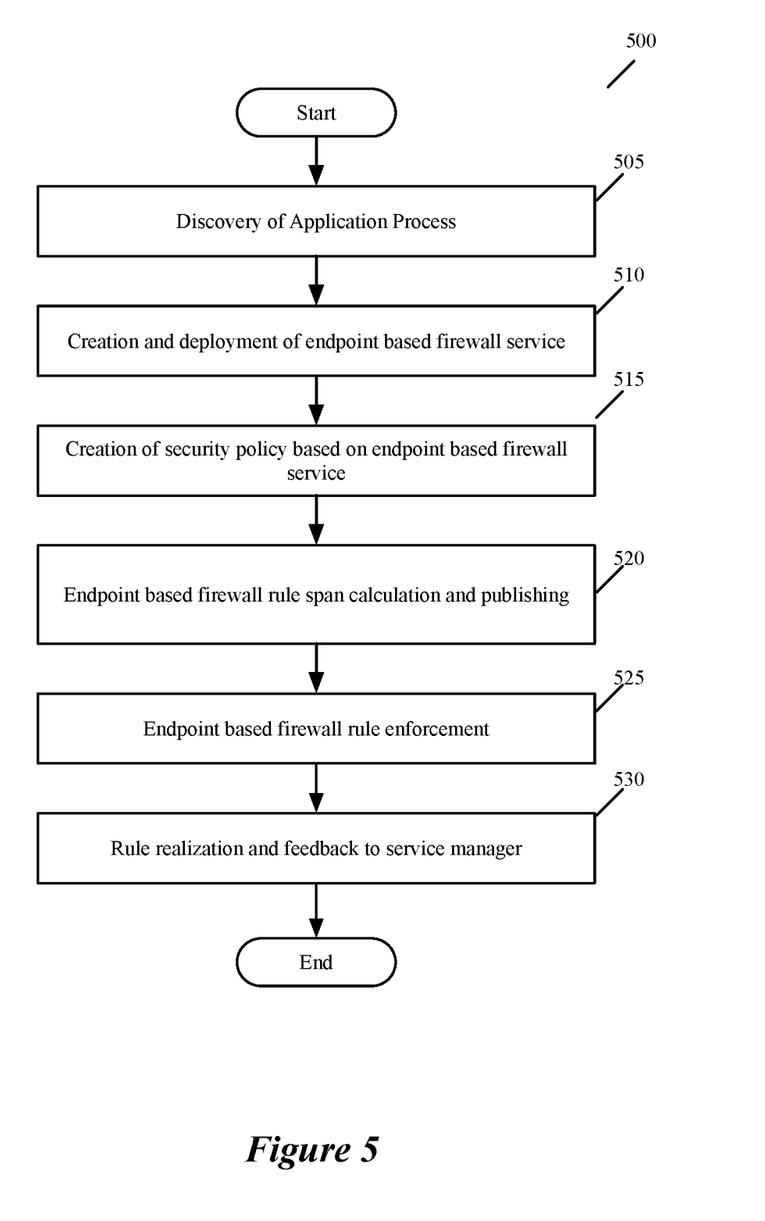
FIG. 5 illustrates a process that some embodiments perform to create, deploy and enforce endpoint service based firewall rules.

FIG. 5 illustrates a process 500 that some embodiments perform to create, deploy and enforce endpoint service based firewall rules. As shown, the process initially generates (at 505) an inventory of existing applications that are running inside a particular network (e.g., a tenant's logical network) within a datacenter. The inventory is used to subsequently define service rules a further described below. In some embodiments, a set of service managers directs discovery agents running on a set of host computers to provide an inventory of all applications running on a set of endpoint machines executing on the set of host computers. The set of endpoint machines are endpoint machines that belong to the particular network.

For instance, in some embodiments, the particular network is a logical network of a particular tenant of the datacenter, and the set of endpoint machines are virtual machines, containers and/or bare metal servers of the particular tenant that execute on a set of host computers in the datacenter. In some embodiments, the set of endpoint machines includes (1) machines that execute on top of hypervisors executing on host computers and managed by the set of service managers, and (2) machines (e.g., bare metal computers, virtual machines, and/or containers) that are not managed by the set of service managers.

In some of these embodiments, the discovery engines only run on host computers managed by the set of service managers (e.g., host computers with certain type of hypervisors). However, the inventory data collected by these discovery engines can still be useful for formulating service rules to enforce on machines not managed by the set of service managers as unmanaged machines of a tenant often run many of the same applications as the managed machines of the tenant. Also, some embodiments provide controls (e.g., APIs or user interface controls) for the tenants to provide inventory data to supplement the inventory data collected by the discovery engines associated with the managed machines.

In some embodiments, the discovery engines and/or other modules on the host computers and service managers provide visualization tools to visualize data message flows to and from a guest triggered by various application processes. This information is available in the database of the service manager set, and forms part of the discovery platform. These features in some embodiments provide the functionality grouping applications into tiers and creating security groups that can be used as entities for defining firewall rules.

At 510, the process deploys an endpoint based firewall services at a host cluster level for the datacenter. This service is responsible for setting up the communication channel from the service manager set to the host and the guest to push the effective rules to each endpoint. In some embodiments, this involves deployment of the agents in every endpoint and establishing a trusted communication channel (e.g., RabbitMQ) between the endpoint machines and the set of service managers.

At 515, through the service manager framework, a network administrator specifies service policies. In some embodiments, this framework provides a user interface and/or a set of API through which administrators can define services policies. The service policies in some embodiments can be defined by reference to security groups. The framework in some embodiments can create, manage and apply the policies to security groups created by the process 500.

Once the administrator has created and applied the appropriate security policies with the service rules (which can be defined by reference to security groups), the service manager identifies (at 520) the endpoint machines to which the rules should be pushed. Since the manager has all the information of the desired state of the system including the tenant networks, the service manager pushes the effective set of rules per endpoint machine.

For example, a service rule might specify "All Firefox version 5 processes should not be allowed to access ANY endpoint machine on a tenant logical network X". For such a rule, the rule span calculation is as follows in some embodiments. Based on the information gathered from endpoint monitoring feature, the service manager identifies endpoint machines that execute Firefox version 5. From this identified set of endpoint machines, the service manager then identifies which amongst them are on logical network X, by examining its database. The service manager then pushes the rules to host computers on which the endpoint machines reside.

Once the service rules are pushed from the service manager and distributed to the host computers with the identified endpoint machines, the rules are provided to the service engines and/or SVMs executing on these machines. For host computers with hypervisors managed by the service managers, the service rules are provided through one or more of the hypervisor communication channels to the service engines and/or SVMs. On the other hand, for host computers that do not have hypervisors managed by the service managers, the service rules are provided to the service engines 160 of the monitoring agents 150 executing on each endpoint machine.

As mentioned above, the monitoring agent 150 in some embodiments registers hooks into the endpoint machines OS (e.g., hooks into Windows Filtering Platform (WFP) of a Windows machine) to intercept network events and provide metadata about the connection. This metadata includes the process name, ID, hash, etc. In some embodiments, the service engine 160 of the monitoring agent 150 can store the service rules based on the 5 tuples and the contextual attributes (e.g., process information) provided by service manager. When an application process attempts to initiate a connection, the monitoring agent 150 trap the network event and attempts to match its contextual attributes (e.g., its process information and the destination field) with the configured service rules.

If there is a match, then the monitoring agent performs the appropriate service action. For instance, unlike other existing solutions, the enforcement in some embodiments does not happen at the network interface or the guest OS level but only for that process which would be allowed or denied to access the destination. Some service policies might not terminate or suspend a process, and could allow the process to run while its packets are being examined (e.g., through deep packet inspection) or replicated, or while the operation of the process itself are being replicated. Other service policies take a whitelisting approach and do not allow a rogue or un-sanctioned process to start by terminating the process after performing the service check. Accordingly, the service-management system of some embodiments can terminate and block some processes, while allowing other processes to proceed and be further inspected/replicated.

In some embodiments, the service management system has an ability to display the realized effective rule sets for every endpoint machine in a centralized manner. The security administrator would be able to view and monitor which endpoint based security policies are being enforced and which endpoint machines are contained under the application process based security groups. From a host computer, the feedback received from the network introspection driver is sent (at 530) according to a configurable frequency to the service manager via the same communication channel that was used to send the service rules from the service manager to the host computer. This feedback contains metadata that can be used for post processing and provide visibility of the endpoint based firewall policies applied on various workloads. The data collected in the manager would also be processed through an analytical engine to provide recommendations for enhanced rules to the administrator.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
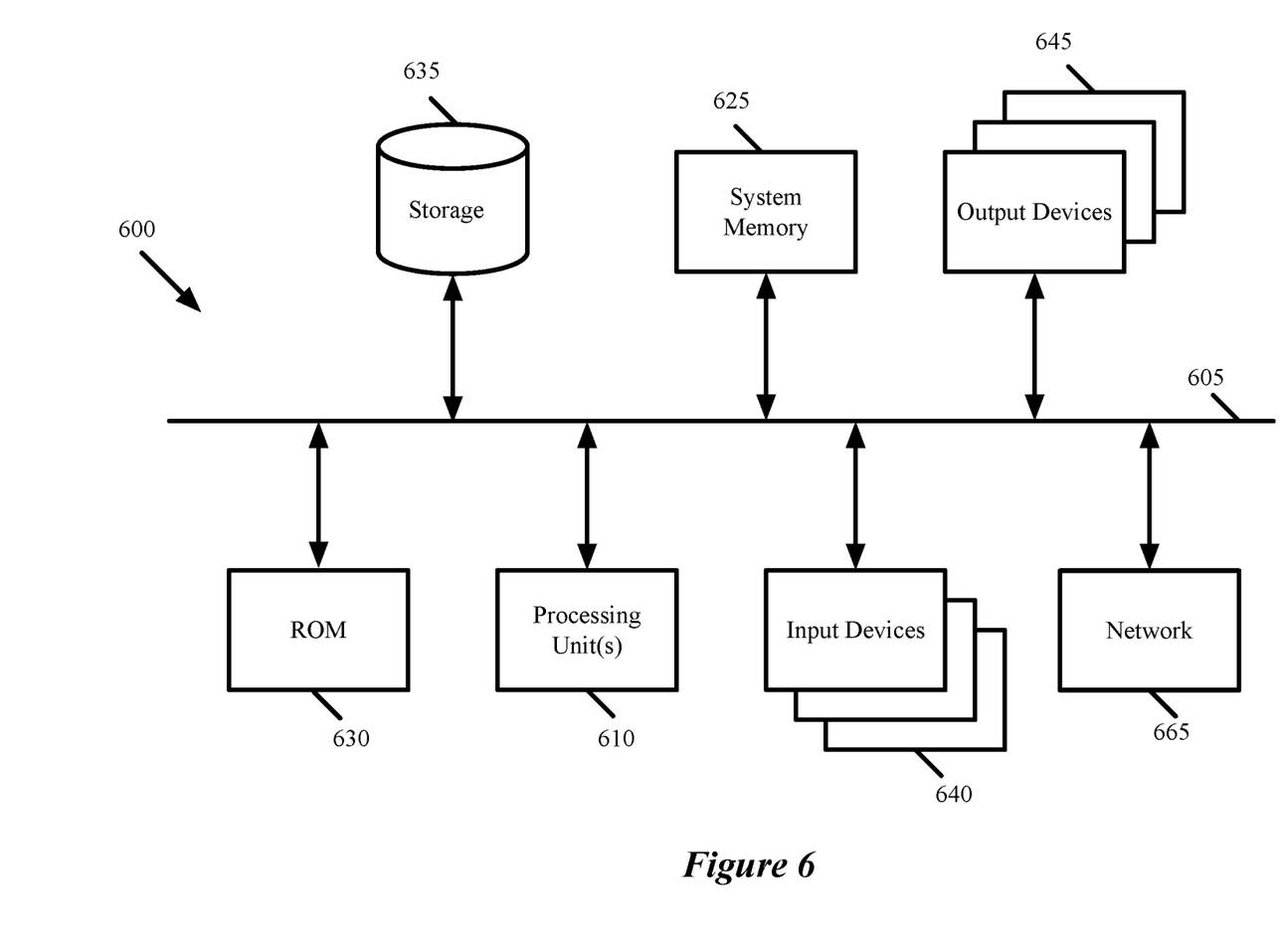
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, and managers. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims

We claim:

1. A method of performing services on heterogeneous endpoint machines in a datacenter, the method comprising: on a first endpoint machine of a first type and executing on a first host computer, installing a first guest introspection (GI) agent and a first service engine; on a second endpoint machine of a different, second type and executing on a second host computer, installing a second guest introspection (GI) agent; configuring the first GI agent to capture and store a first set of contextual data items associated with a first new launched process on the first endpoint machine, said first set of contextual data items for the first service engine on the first endpoint machine to use to perform a process-control service on the first new launched process; and configuring the first service engine to register with a set of one or more notification services on the first endpoint machine to receive notifications regarding new launched processes for at least one application executing on the first endpoint machine, wherein the first service engine performs the process-control service on launched processes identified in response to receiving a notification, by using stored contextual data items associated with the identified launched processes; and configuring the second GI agent to capture a second set of contextual data items associated with a second new launched process on the second endpoint machine and to provide the second set of contextual data items to be stored outside of the second endpoint machine on the second host computer, in order for a second service engine, which executes on the second host computer separately from the second endpoint machine, to use to perform a process-control service on the second new launched process.

2. The method of claim 1, wherein the first GI agent notifies the first service engine of the first launched process.

3. The method of claim 2, wherein the first GI agent provides at least one captured contextual data item to the first service engine along with the notification of the first launched process.

4. The method of claim 2, wherein each service engine retrieves from a storage at least one contextual data item that the corresponding GI agent stored in the storage for the new launched process.

5. The method of claim 1, wherein the process-control service is a service that determines whether a process should be allowed, terminated, have its operations replicated, be designated for malware inspection, or have the data messages that it sends or receives be subject to deep packet inspection.

6. The method of claim 1, wherein each service engine performs the process-control service based on a set of service rules each of which comprises a rule identifier and a service action, the rule identifiers of at least a subset of service rules defined by reference to at least one contextual data item.

7. The method of claim 1, wherein the first endpoint machine is a bare metal machine, and the second endpoint machine is a virtual machine executing on top of a hypervisor that executes on the second host computer.

8. The method of claim 1, wherein the first endpoint machine is a container, and the second endpoint machine is a virtual machine executing on top of a hypervisor that executes on the second host computer.

9. The method of claim 1, wherein the endpoint machines are virtual machines.

10. A non-transitory machine readable medium comprising sets of instructions for execution by at least one hardware processing unit of a computer to perform services on heterogeneous endpoint machines in a datacenter, the sets of instructions for: on a first endpoint machine of a first type and executing on a first host computer, installing a first guest introspection (GI) agent and a first service engine; on a second endpoint machine of a different, second type and executing on a second host computer, installing a second guest introspection (GI) agent; configuring the first GI agent to capture and store a first set of contextual data items associated with a first process event associated with a first process on the first endpoint machine, said first set of contextual data items for the first service engine on the first endpoint machine to use to perform a process-control service on the first process; and configuring the first service engine to register with a set of one or more notification services on the first endpoint machine to receive notifications regarding new launched processes for at least one application executing on the first endpoint machine, wherein the first service engine performs the process-control service on launched processes identified in response to receiving a notification, by using stored contextual data items associated with the identified launched processes; and configuring the second GI agent to capture a second set of contextual data items associated with a second process event associated with a second process on the second endpoint machine and to provide the second set of contextual data items to be stored outside of the second endpoint machine on the second host computer, in order for a second service engine, which executes on the second host computer separately from the second endpoint machine, to use to perform a process control service on the second process.

11. The non-transitory machine readable medium of claim 10, wherein the first GI agent notifies the first service engine of the first process event.

12. The non-transitory machine readable medium of claim 11, wherein the first GI agent provides at least one captured contextual data item to the first service engine along with the notification of the first process event.

13. The non-transitory machine readable medium of claim 11, wherein each service engine retrieves from a storage at least one contextual data item that the corresponding GI agent stored in the storage for the process event.

14. The non-transitory machine readable medium of claim 10, wherein the contextual data items include data other than layer 2, layer 3 and layer 4 header values of the data messages.

15. The non-transitory machine readable medium of claim 10, wherein the contextual data items include layer 7 data tuples.

16. The non-transitory machine readable medium of claim 10, wherein the contextual data items include at least one of a process identifier and a user group identifier.

17. The non-transitory machine readable medium of claim 10, wherein the first endpoint machine comprises one of a bare metal machine, a container, and a virtual machine, and the second endpoint machine is a virtual machine executing on top of a hypervisor that executes on the second host computer.

18. A method of performing services on heterogeneous endpoint machines in a datac enter, the method comprising: on a first endpoint machine of a first type and executing on a first host computer, installing a first guest introspection (GI) agent and a first service engine; on a second endpoint machine of a different, second type and executing on a second host computer, installing a second guest introspection (GI) agent; configuring the first GI agent to capture and store a first set of contextual data items associated with a first new launched process on the first endpoint machine, said first set of contextual data items for the first service engine on the first endpoint machine to use to perform a process-control service on the first new launched process; configuring registering each GI agent to register with a set of one or more notification services on the corresponding endpoint machine to receive notifications regarding new process launch events for at least one application executing on the corresponding endpoint machine, wherein each GI agent captures and stores contextual data associated with a new launched process in response to receiving a notification from the notification service on the corresponding endpoint machine regarding the new launched process; configuring the second GI agent to capture a second set of contextual data items associated with a second new launched process on the second endpoint machine and to provide the second set of contextual data items to be stored outside of the second endpoint machine on the second host computer, in order for a second service engine, which executes on the second host computer separately from the second endpoint machine, to use to perform a process-control service on the second new launched process.

* * * * *